(12) United States Patent
DellaCorte et al.

(10) Patent No.: US 8,182,741 B1
(45) Date of Patent: May 22, 2012

(54) BALL BEARINGS COMPRISING NICKEL-TITANIUM AND METHODS OF MANUFACTURE THEREOF

(75) Inventors: Christopher DellaCorte, Medina, OH (US); Glenn N. Glennon, Berlin, CT (US)

(73) Assignees: The United States of America as represented by the National Aeronautics and Space Administration, Washington, DC (US); Abbott Ball Company, West Hartford, CT (US)

( * ) Notice: Subject to any disclaimer, the term of this patent is extended or adjusted under 35 U.S.C. 154(b) by 462 days.

(21) Appl. No.: 12/544,742

(22) Filed: Aug. 20, 2009

(51) Int. Cl.
    *C22C 19/03* (2006.01)
(52) U.S. Cl. ...................................................... 420/441
(58) Field of Classification Search .................. 420/441; 33/517; 74/570.3; 148/906
    See application file for complete search history.

(56) References Cited

U.S. PATENT DOCUMENTS

| | | |
|---|---|---|
| 3,672,879 A | 6/1972 | Buehler |
| 3,726,722 A | 4/1973 | Foerster et al. |
| 4,133,680 A | 1/1979 | Babaskin et al. |
| 4,282,033 A | 8/1981 | Goldstein et al. |
| 4,719,077 A | 1/1988 | Suzuki et al. |
| 5,078,964 A | 1/1992 | Arndt et al. |
| 6,422,010 B1 | 7/2002 | Julien |
| 6,607,693 B1 | 8/2003 | Saito et al. |
| 6,886,986 B1 | 5/2005 | Julien |

OTHER PUBLICATIONS

William J. Buehler, Frederick E. Wang, "A Summary of Recent Research on the Nitinol Alloys and Their Potential application in Ocean Engineering" Ocean Engineering, vol. 1, pp. 105-120, Pergamon Press 1968. Jul. 21, 1967. Printed in Great Britain.
William J. Buehler, "Intermettalic Compound Based Materials for Structural Application", U.S. Naval Ordinance Laboratory Silver Springs, Maryland, The Seventh Navy Science Symposium: Solution to Navy Problems Through Advanced Technology, May 14, 15, 16, 1963, U.S. Naval Aviation Medical Centor, Pensacola, Florida. vol. 1, pp. 1-31.
William J. Buehler, J.V. Gilfrich, and R.C. Wiley, Effect of Low-Temperature Phase Changes on the Mechanical Properties of Alloys near Composition TiNi, U.S. Naval Ordinance Laboratory, Silver Spring, Maryland, Journal of Applied Physics, vol. 34, No. 5, May 1963, pp. 1475-1477.
Richard W. Roberts, Robert S. Owens, "Titanium Lubrication", Nature, vol. 200, Oct. 26, 1963, pp. 357-358.
William R. Jones, Jr., Stephen V. Pepper and Donald R. Wheeler, Nasa Glenn Research Center, Cleveland, OH, Mark J. Jansen and Quynhgiao Nguyen, Brookpark, Oh, Achim Scroer, Neuchatel, Switzerland, The Effect of Stress and TiC Coated Balls on Lifetime of a Perflouropolyalkylether Using a Vacuum Rolling Contact Tribometer, Tribology Conference in Seattle Washington, Oct. 1-4, 2000, Jul. 10, 2000, pp. 685-688.
Michael N. Gardos, Hyun-Soo Hong and Ward O. Winer, "The Effect of Anion Vacancies on the Tribological Properties of Rutile (TIO2-x), Part II: Experimental Evidence", Annual Meeting in Atlanta, Georgia, May 1-4, 1989, vol. 22 (1990), pp. 209-220.
William R. Jones, Jr. and Stephen V. Pepper, Glenn Research Center, Cleveland, OH Mark J. Jensen and QuynhGiao N. Nguyen, AYT Corporation, Brook Park, OH Edward P. Kingsbury, IRC Walpole, Massachusets, Stuart H. Loewenthal, Lockhead Martin Missiles and Space, Sunnyvale CA, Roamer E. Predmore, Goddard Space Flight Center, Greenbelt, Maryland, A New Apparatus to Evaluate Lubricants for Space Applications—The Spiral Orbit Tribometer (SOT), NASA/TM-2000-209935, Mar. 2000, pp. 1-7.
C. DellaCorte, et al. "Intermetallic Nickel-Titanium Alloys for Oil-Lubricating Bearing Applications" NASA/TM 2009-215646. Mar. 2009.

*Primary Examiner* — Jessee R. Roe
(74) *Attorney, Agent, or Firm* — Cantor Colburn LLP

(57) ABSTRACT

Disclosed herein is a friction reducing nickel-titanium composition. The nickel-titanium composition includes a first phase that comprises nickel and titanium in an atomic ratio of about 0.45:0.55 to about 0.55:0.45; a second phase that comprises nickel and titanium in an atomic ratio of about 0.70: 0.30 to about 0.80:0.20; and a third phase that comprises nickel and titanium in an atomic ratio of about 0.52:0.48 to about 0.62:0.38. A bearing for reducing friction comprising a nickel-titanium composition comprising a first phase that comprises nickel and titanium in an atomic ratio of about 0.45:0.55 to about 0.55:0.45; a second phase that comprises nickel and titanium in an atomic ratio of about 0.70:0.30 to about 0.80:0.20; and a third phase that comprises nickel and titanium in an atomic ratio of about 0.52:0.48 to about 0.62: 0.38; where the bearing is free from voids and pinholes.

21 Claims, 12 Drawing Sheets

FIG. 6
Formula Weight = 911.7277
Molecular Formula = $C_{65}H_{130}$
tri-substituted (2-octyldodecyl) cyclopentane
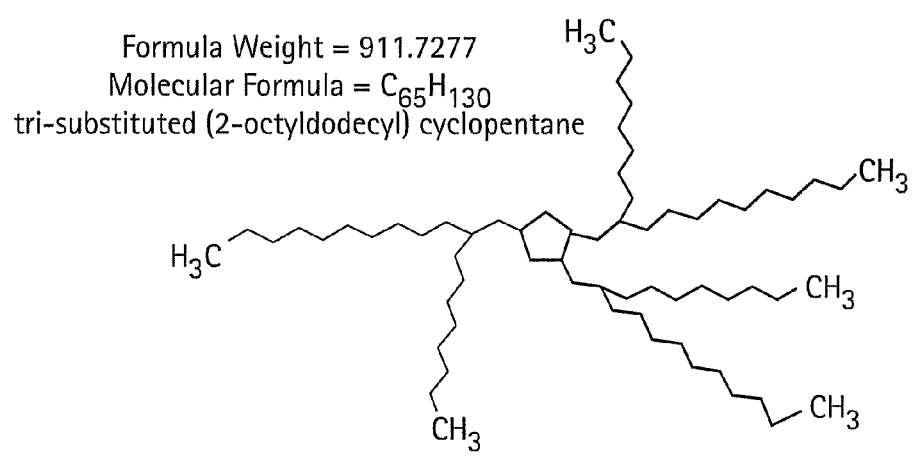
di-substituted (2-octyldodecyl) cyclopentane
Molecular Formula = $C_{45}H_{90}$
Formula Weight = 631.1961
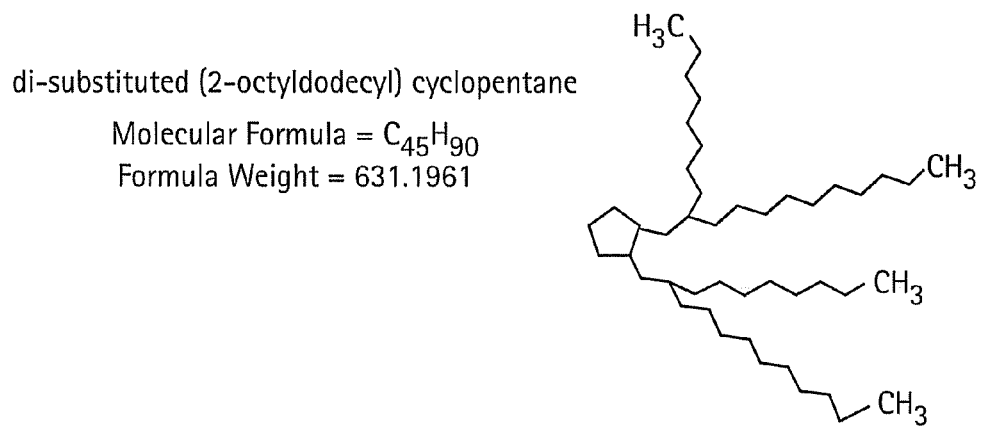

Nitinol 60 ball lubricated with 21 μg Pennzane 2001A running on 440C steel plates

US 8,182,741 B1

BALL BEARINGS COMPRISING NICKEL-TITANIUM AND METHODS OF MANUFACTURE THEREOF

BACKGROUND

This disclosure is directed to ball bearings comprising nickel-titanium and to methods of manufacture thereof.

Bearings such as those used in reducing sliding friction (e.g., bushings, journal bearings, sleeve bearings, rifle bearings, plain bearings, or the like) or those used in reducing rolling friction (e.g., ball bearings, roller bearings, or the like) are often manufactured from materials comprising metals, ceramics or organic polymers. Examples of metals are stainless steel, bronze, aluminum, or the like. Examples of ceramics are sapphire, glass, or the like. Examples of polymers are nylon, polyoxymethylene, polytetrafluoro ethylene, polyolefins, or the like.

One problem with the aforementioned metals, ceramics and polymers is corrosion. For example bearings manufactured from steel can undergo rusting, which reduces the ability of the bearing to minimize friction over time.

In addition, lubricants used on the bearings also can undergo degradation to reduce the ability of the bearing to minimize friction. Often, the by-products of friction contaminate the lubricants, which render damage to the bearing as well as the lubricant.

It is therefore desirable to manufacture bearings from materials that do not undergo corrosion and that do not produce by-products that damage the bearing or the lubricant. Nitinol 60 (comprising about 60 weight percent nickel and about 40 weight percent titanium) produces parts that are resistant to corrosion. One of the drawbacks of Nitinol 60 is that it is difficult to manufacture components from it that are without casting defects such as voids and pinholes. When a Nitinol 60 component is manufactured by casting a melt into a mold, it generally contains voids and pinholes, which ruins the surface finish and renders the component unusable for its intended application. It is therefore desirable to manufacture Nitinol 60 components that are devoid of casting defects and that can be polished to fine tolerances. Another drawback of Nitinol 60 is that it is very hard and therefore difficult to machine. It is also desirable to manufacture these components to fine tolerances so as to minimize any additional undesirable machining

SUMMARY

Disclosed herein is a nickel-titanium composition that includes a first phase that comprises nickel and titanium in an atomic ratio of about 0.45:0.55 to about 0.55:0.45; a second phase that comprises nickel and titanium in an atomic ratio of about 0.70:0.30 to about 0.80:0.20; and a third phase that comprises nickel and titanium in an atomic ratio of about 0.52:0.48 to about 0.62:0.38.

Disclosed herein too is a bearing for reducing friction comprising a nickel-titanium composition comprising a first phase that comprises nickel and titanium in an atomic ratio of about 0.45:0.55 to about 0.55:0.45; a second phase that comprises nickel and titanium in an atomic ratio of about 0.70:0.30 to about 0.80:0.20; and a third phase that comprises nickel and titanium in an atomic ratio of about 0.52:0.48 to about 0.62:0.38; where the bearing is free from voids and pinholes.

Disclosed herein too is an article manufactured by the aforementioned method and from the aforementioned compositions.

BRIEF DESCRIPTION OF FIGURES

FIG. 6 depicts the chemical structures for PENNZANE 2001A®;

DETAILED DESCRIPTION

Figure 1:
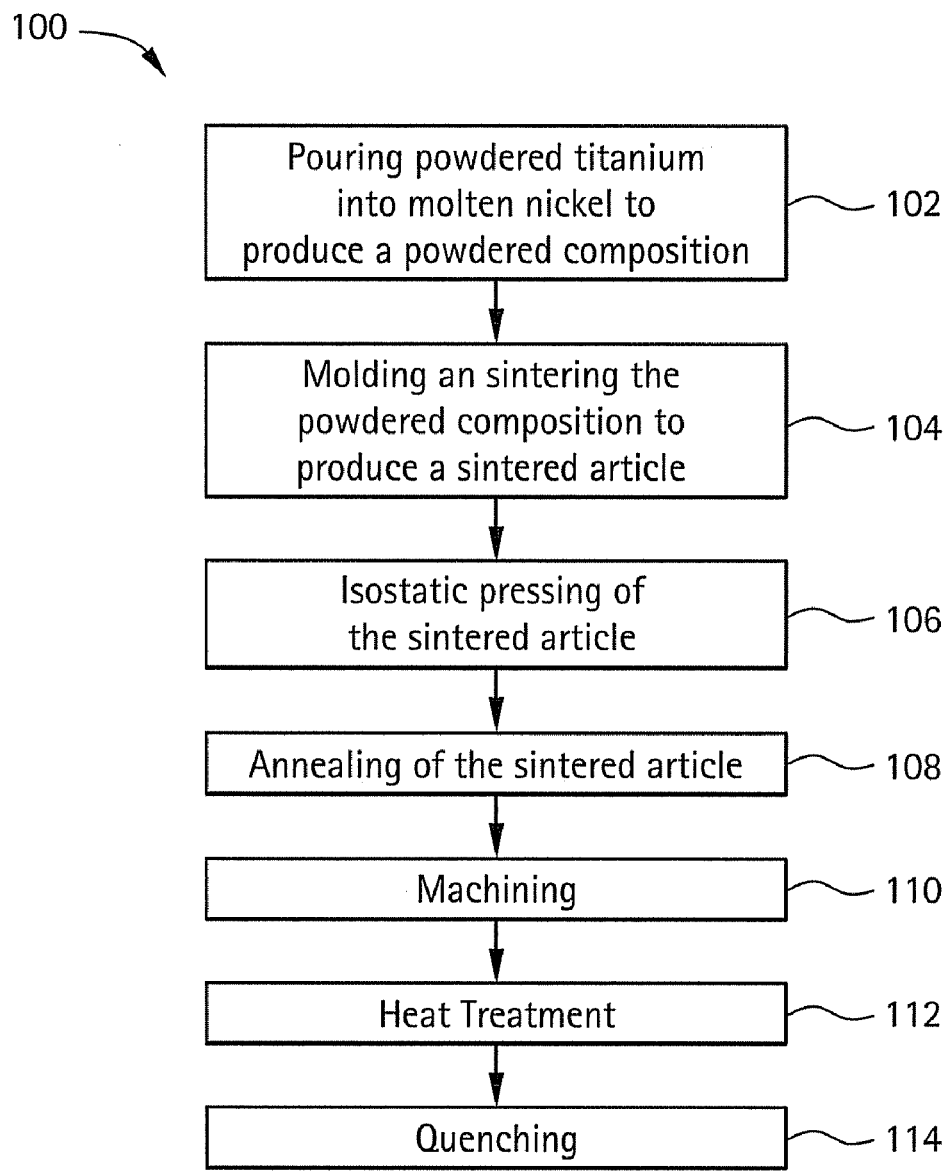
FIG. 1 is a schematic depiction of an exemplary method of manufacturing an article using a nickel-titanium composition.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition phrase "comprising" can be replaced by "consisting of" or "consisting essentially of".

Disclosed herein is a method for manufacturing bearings from a nickel-titanium composition that comprises nickel in an amount of about 58 to about 62 weight percent (wt %) and titanium in an amount of about 38 to about 42 wt %. The method comprises first manufacturing a powdered composition of nickel-titanium particles. The powdered composition of nickel-titanium particles is then placed in a mold and sintered to a first temperature at a first pressure for a first period of time to produce a sintered preform. The sintered preform is then annealed at a second temperature, a second pressure for a second period of time to produce an annealed preform. The annealed preform is then subjected to machining to produce bearings. The bearings are then heat treated to a third temperature at a third pressure for a third period of time. The bearing was then quenched to develop an article having a Rockwell hardness of greater than or equal to about 55 Rockwell C.

The bearings comprise at least 4 different phases of nickel-titanium, each phase having a different volume ratio of nickel to titanium. The bearings can be used in frictional devices without damaging or degrading lubricants employed in the frictional devices for extended periods of time. This leads to extended life cycles for the lubricants as well as the frictional device thereby reducing costs associated with maintenance downtime and product replacement.

The nickel-titanium composition used in the manufacturing of the bearings disclosed herein is especially advantageous because the nickel-titanium phases contained therein do not degrade lubricants in a manner similar to other commercially available nickel-titanium compositions. Titanium metal is known to be very aggressive towards lubricants. The titanium present in other commercially available titanium alloys therefore causes a degradation of the lubricant, which causes galling and seizing of frictional devices in which it is employed. However, in the nickel-titanium compositions disclosed herein, it has been inadvertently discovered that the titanium is effectively passivated by being bonded to nickel so that it does not aggressively attack lubricants that are used in its presence. Because of the effective passivation of the titanium in the nickel-titanium composition, the nickel-titanium composition can be used in a variety of different environments including applications in space. In particular, the hardness of the nickel-titanium composition together with its low density, high corrosion resistance and non-magnetic properties make the composition useful for applications in space.

Disclosed herein too is a friction reducing composition that comprises the nickel-titanium composition and a lubricant. The lubricant can comprise a fluid such as an oil, a grease, water, or the like. The friction reducing composition can be advantageously used in a frictional device without any degradation of the lubricant.

With reference now to the FIG. 1, a method (100) for manufacturing the nickel-titanium composition comprises pouring powdered titanium into molten nickel or pouring powdered nickel into molten titanium to produce a powdered composition (102), molding and sintering the powdered composition (104) to a first temperature at a first pressure for a first period of time to produce a sintered preform. The sintered preform is then subjected to hot isostatic pressing (106) followed by optional machining (108) and to further heat treatment (110) and quenching (114) to produce the desired nickel- titanium article.

Figure 2:
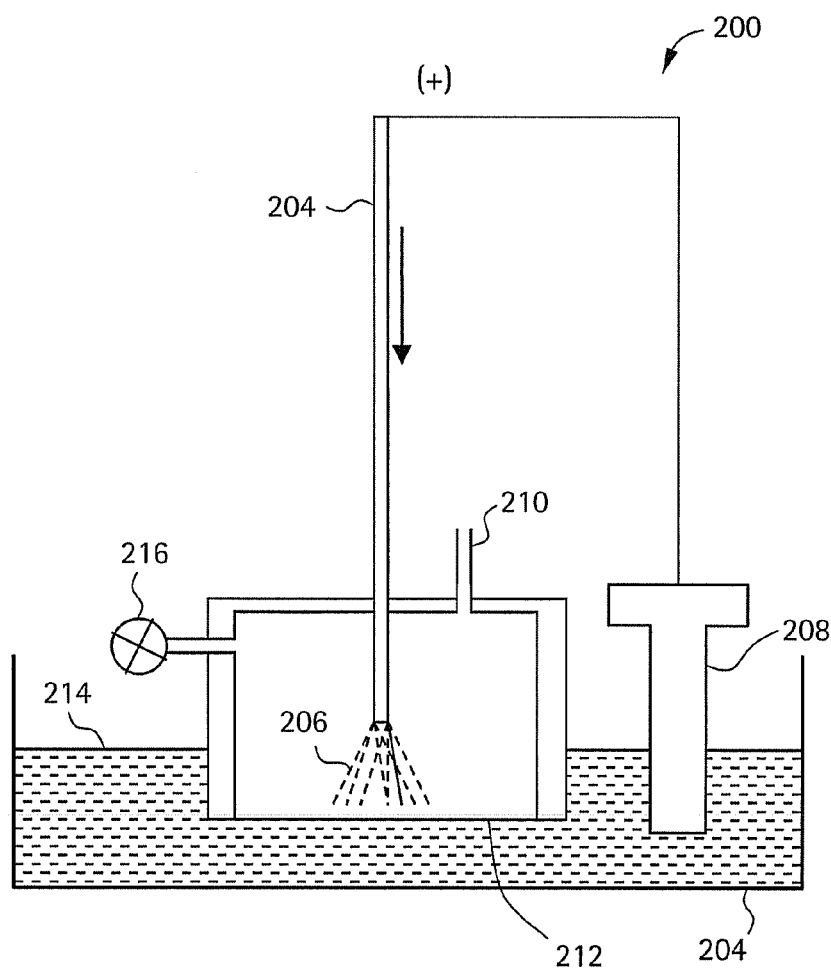
FIG. 2 is an exemplary depiction of a device that is used to manufacture nickel-titanium powdered compositions.

The powdered composition may be obtained by a variety of methods. With reference now to the FIG. 2, a titanium elongate mass 202 is fed into a crucible 204 containing molten nickel in a device 200 to produce the powdered composition (102) that comprises a nickel-titanium alloy. The titanium elongate mass 202 is generally disposed perpendicular to the surface of the molten nickel in the crucible 204. Examples of the elongate mass is a wire, a rod, a tube, a bar, or the like. The titanium elongate mass is also fed with an effective electrical current from a source 208. The electrical current is fed to the titanium elongate mass at a constant voltage and at current limiting condition to create an electric arc and to facilitate the formation of a spray of molten titanium particles 206. The spray of molten titanium particles 206 falls into the molten nickel by the action of gravity and is then dispersed into the molten nickel to form nickel-titanium alloy particles.

The molten nickel is loaded into a crucible in a furnace. The amount of nickel in the crucible is adjusted so that its weight in the powdered composition will be about 58 to about 62 wt %, specifically about 59 to about 61 wt %, and more specifically about 59.5 to about 60.5 wt % of the powdered composition. An exemplary amount of nickel is about 60 wt % of the powdered composition.

The remaining weight of the powdered composition is titanium. In an exemplary embodiment, the titanium will be about 38 to about 42 wt %, specifically about 39 to about 41 wt %, and more specifically about 39.5 to about 40.5 wt % of the powdered composition. An exemplary amount of titanium is about 40 wt % of the powdered composition.

The crucible is maintained at a temperature of greater than or equal to the melting point of nickel. It is desirable to maintain the crucible at a temperature that is less than or equal to the melting point of titanium. The crucible is heated by a suitable power source to maintain the molten nickel in the melt state. During the feeding of the titanium into the molten nickel or vice versa, the crucible is first purged with an inert gas through a port 210. The inert gas exits the device through a relief valve 216. The inert gas displaces any reactive gases present in the crucible. It is also desirable for the inert gas to depress the surface of the molten nickel at the alloying zone. As can be seen in the FIG. 2, the height 212 of the surface of the molten nickel in the alloying zone is lower than the height 214 of the surface of the molten nickel outside the alloying zone. The alloying zone is the zone where the spray of molten titanium particles contacts the molten nickel.

Examples of suitable relatively stable or inert gases are argon, nitrogen, helium, nitrogen, carbon dioxide or carbon monoxide. In one embodiment, the feeding of the titanium elongate mass into the molten nickel is conducted in an argon atmosphere. The crucible is sealed so as to be isolated from the ambient atmosphere.

As the spray of molten titanium enters the molten nickel, it forms solid particles of a nickel-titanium alloy, which are then collected from the bottom of the crucible and are subjected to sintering to form the sintered preform. The particles so recovered form an occluded mass. For example, the particles of nickel-titanium can be removed from the molten nickel as a mass of particles with occluded nickel. The occluded nickel can be removed by further treatment to yield the nickel-titanium powdered composition, which is then subjected to sintering.

Figure 3:
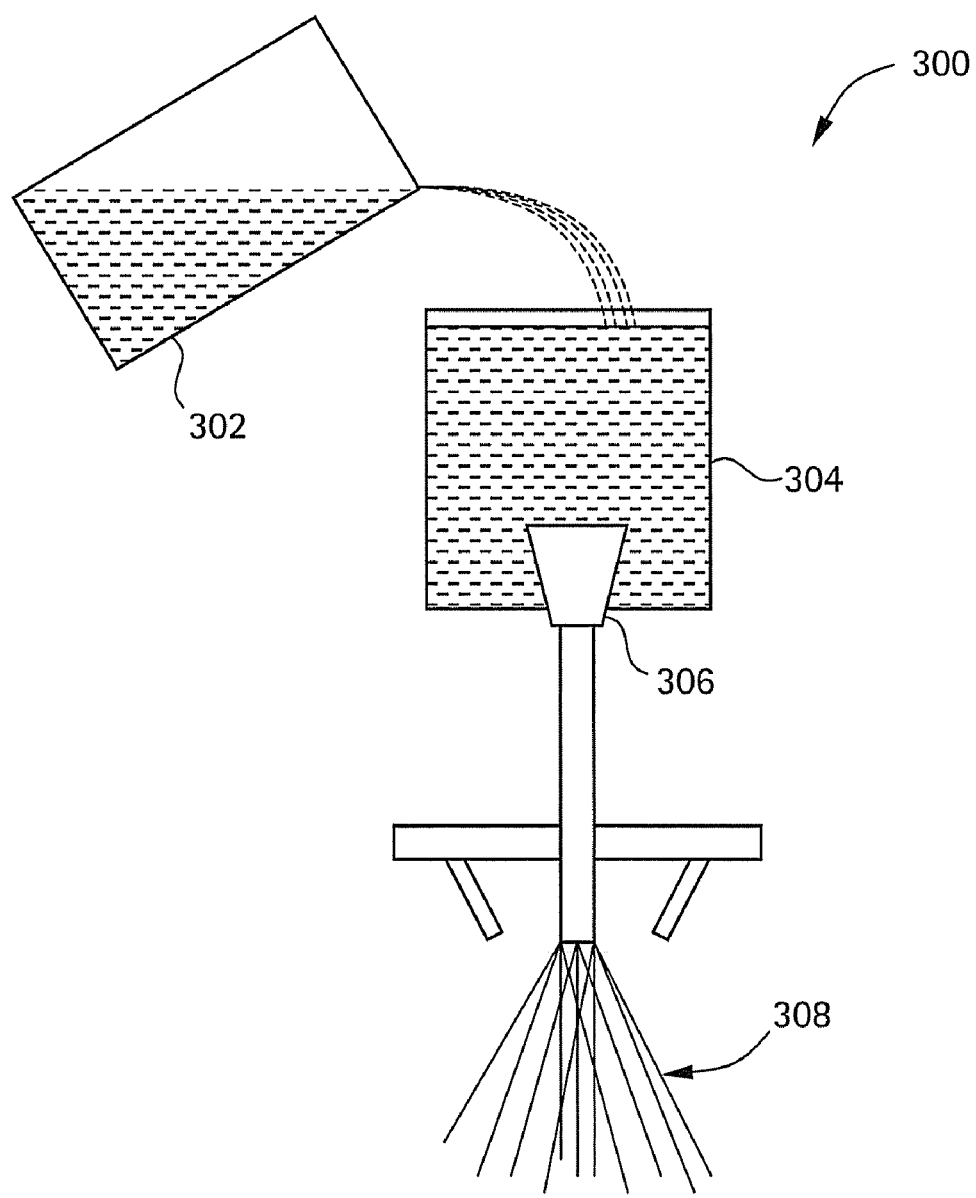
FIG. 3 is an exemplary depiction of another device that is used to manufacture nickel-titanium powdered compositions.

The FIG. 3 depicts another device 300 that can be used for the production of the nickel titanium powdered composition. In one embodiment, in another method of manufacturing the powdered composition, molten titanium is poured from a first crucible 302 into a second crucible 304, which contains molten nickel as depicted in the FIG. 3.

The amount of molten nickel loaded into the second crucible 304 will be about 58 to about 62 wt %, specifically about 59 to about 61 wt %, and more specifically about 59.5 to about 60.5 wt % of the powdered composition. An exemplary amount of nickel is about 60 wt % of the powdered composition that is formed as detailed below.

The amount of molten titanium that is discharged from the first crucible 302 into the second crucible 304 will be about 38 to about 42 wt %, specifically about 39 to about 41 wt %, and more specifically about 39.5 to about 40.5 wt % of the powdered composition. An exemplary amount of titanium is about 40 wt % of the powdered composition.

The second crucible 304 contains a teeming nozzle 306 whose function it is to meter the molten nickel and titanium into the atomizing zone 308. As the molten alloy passes through the teeming nozzle 306 an inert gas is passed through the plenum 308 and discharged through the jets 310 to impinge on the molten metal. The plenum generally has about 8 jets through which the inert gas is discharged. In one embodiment, 4 jets can be arranged to discharge the inert gas at a location that is closed to the atomizing zone, while 4 other jets are positioned at a point further downstream from the atomizing zone (not shown). The entire device 300 depicted in the FIG. 3 can be enclosed (not shown) to prevent any reactive gases from contacting the molten metals. The enclosure is generally purged with an inert gas prior to pouring the molten titanium from the first crucible 302 into the second crucible 304. Argon is generally used as the inert gas in the jets as well as in the enclosure.

The molten alloy is discharged from the atomizing zone in the form of a powder and can be collected in a cooling bath. The powder can be cooled in a bath. The bath can contain cold water, liquid nitrogen, liquid argon, or other cryogenic liquids. In one embodiment, in one method of manufacturing the powered composition using the device of the FIG. 3, molten titanium is poured into the molten nickel while several jets of argon gas are directed into the mixture of molten nickel and molten titanium to disperse the mixture into particles that comprise nickel and titanium. The particles solidify into tiny spheroids at the bottom of the device 300 where they are cooled by a pool of liquid argon.

In both methods of manufacturing particles disclosed above, the powdered composition has an average particle size of about 50 to about 150 micrometers, specifically about 70 to about 130 micrometers, and more specifically about 80 to about 120 micrometers. An exemplary average particle size for the powdered composition is less than or equal to about 100 micrometers.

In yet another method of manufacturing the powdered composition, nickel powder and titanium powder are ground together in a ball mill. Ball milling generally causes an intimate mixing of the nickel with the titanium. The ball milling may be conducted with stainless steel balls, carbide balls or ceramic balls.

The ball milling can be conducted for a period of 15 minutes to about 480 minutes, specifically about 30 to about 350 minutes, and more specifically about 45 to about 120 minutes. The ball milling may be conducted in a vacuum or in the presence of an inert gas. After ball milling the powdered composition may be subjected to further processing as described below.

As noted in the FIG. 1, the powdered composition is next subjected to molding and sintering (104) to produce a sintered preform. The powdered composition may be poured into molds of suitable shapes. As noted above, the powdered composition in the molds is subjected to a first temperature at a first pressure for a first time period. The molds are subjected to vibration and/or to a vacuum in order to remove any entrapped air and then subjected to sintering in a furnace The powdered composition is then disposed in a mold that has the desired shape. For example, if a ball bearing is the desired product, then the mold generally has the shape of a sphere. The mold may be manufactured from a ceramic or from a suitable wax. After the powdered composition is disposed in the mold, the molds may be vibrated physically or be subjected to ultrasonication to remove any entrapped air and to permit the settling of the powdered composition. The mold along with the powdered composition contained therein is then subjected to sintering in a furnace.

The sintering in the furnace is conducted at a first temperature of about 1700° F. to about 2250° F. and a first pressure of 30 Torr to about 10 kilograms-force per square centimeter (Kg-f/cm$^2$) for a first time period of about 10 minutes to about 4 hours to produce a sintered preform. A vacuum may be applied to the mold prior to and during the heating operation to remove any entrapped gases from the powdered composition. The sintering may be conducted without a vacuum, under ambient conditions if desired The sintering is conducted for a first time period of about 10 minutes to about 4 hours. In one embodiment, the sintering is conducted at a first temperature of about 1800° F. to about 2200° F., specifically about 1800° F. to about 1900° F. The sintering is conducted at a first pressure of about 3 Torr to about 5 Kg-f/cm2, specifically about 2 Torr to about 2 Kg-f/cm$^2$. The sintering is conducted for a first time period of about 20 minutes to about 180 minutes, specifically about 50 minutes to about 150 minutes. In an exemplary embodiment, the sintering is conducted at a temperature of about 1825° F. to about 1950° F. at ambient pressure for about 120 minutes to form the sintered preform. The sintered preform is then subjected to cooling. In one embodiment, the sintered preform is cooled down to room temperature.

The removal of the sintered preform from the mold is accomplished by breaking the mold. The sintered preform is then removed from the broken mold. The mold can also be dissolved away or thermally melted to release the sintered preform.

The sintered preform upon being removed from the mold is subjected to hot isostatic pressure compaction during which it is subjected to a second temperature at a second pressure for a second time period. The hot isostatic pressure compaction is conducted in a hipping furnace.

The second temperature is about 1700° F. to about 2250° F., specifically about 1800° F. to about 2200° F., and more specifically about 1800° F. to about 1900° F. The second pressure is about 2110 to about 11250 Kg-f/cm$^2$, specifically about 3000 to about 9000 Kg-f/cm$^2$, and more specifically about 4000 to about 8000 Kg-f/cm$^2$. The second time is about 0.5 to about 20 hours, specifically about 1 to about 15 hours and more specifically about 2 to about 5 hours.

The hot isostatically pressed compact has a hardness of about 35 to about 45 when measured using a Rockwell C hardness test at room temperature (about 23° C.). The hot isostatically pressed compact is cooled to room temperature. After hot isostatic pressing, the preforms are free from defects and voids. As noted above, the preforms may be optionally subjected to machining (110) to produce articles that can be used in a variety of different applications.

After manufacturing the preform, it may be subjected to a variety of machining operations including grinding, milling, lapping, drilling, or the like, to produce the aforementioned articles. In one embodiment, the preforms may be sized to be machined into bearings that may be used in frictional applications. Examples of bearings are ball bearings, roller bearings, or the like. It is generally desirable to machine the preform when it hardness of about 40 to about 50 on the Rockwell "C" scale. In one embodiment, it is desirable to carry out the machining when the hardness is less than or equal to about 49 on the Rockwell "C" scale, specifically less than or equal to about 47 on the Rockwell "C" scale and more specifically less than or equal to about 45 on the Rockwell "C" scale.

Following machining the article may be subjected to heat treatment (112). The heat treatment (112) is generally conducted at a third temperature at a third pressure for a third time period. The third temperature is about 1650° F. to about 1900° F., specifically about 1750° F. to about 1850° F., and more specifically about 1775° F. to about 1810° F. The third pressure is about 3 Torr to about 5 Kg-f/cm2, specifically about 2 Torr to about 2 Kg-f/cm$^2$. The third time period for a time period of about 10 minutes to about 5 hours. In one embodiment, the heat treatment is generally conducted at a temperature of about 1750° F. to about 1850° F. for a time period of about 60 minutes to about 180 minutes. In an exemplary embodiment, the heat treatment may be conducted at a temperature of about 1790° F. at ambient pressure for a time period of 150 minutes.

Following the heat treatment, the preform or the machined article may be subjected to a rapid oil quench (114) to produce a hardened nickel-titanium composition (see FIG. 1). The quench can be conducted in quenching media such as oil, water or any other non-reactive fluid. In one embodiment, the quenching media can be stationary (e.g., contained in a reactor) or can be in a state of flow. The quench is conducted to reduce the temperature of the machined articles to room temperature. The hardened nickel-titanium composition generally has a hardness of greater than or equal to about 60 on the Rockwell "C" scale. In one embodiment, the hardened nickel-titanium composition generally has a hardness of greater than or equal to about 62 on the Rockwell "C" scale.

After the quenching (114), the articles are optionally subjected to additional machining. In one embodiment, when the article is a ball bearing, the additional machining may include a ball grinding operation (not shown). After grinding, the ground balls may be lapped and then polished in a ball polishing machine (not shown). The lapping can be conducted using a wide variety of lapping compounds. The lapping gives the balls the desired surface finish and the desired dimensions. The bearings produced in this manner are without pinholes and voids that are commonly produced when the bearings are manufactured from the molten state.

The article that is produced after subjecting the powdered composition to sintering, hot isostatic compaction and annealing has a novel composition. While the nickel-titanium composition contained in the preform comprises titanium in an amount of about 38 to about 42 wt % and nickel in an amount of about 58 to about 62 wt %, the nickel-titanium composition described herein comprises a first phase, a second phase, a third phase and a fourth phase. The first phase is the matrix phase that comprises nickel and titanium in an atomic ratio of about 0.45:0.55 to about 0.55:0.45, specifically about 0.48:0.52 to about 0.52:0.48. In an exemplary embodiment, the atomic ratio of nickel to titanium is about 1:1 and the composition of the phase is designated as NiTi.

The nickel-titanium composition comprises the first phase (NiTi) in an amount of about 65 to about 85 volume percent (vol %), specifically about 67 to about 80 vol %, and more specifically about 68 to about 78 vol %, based on the total volume of the nickel-titanium composition. In an exemplary embodiment, the nickel-titanium composition comprises the first phase (NiTi) in an amount of about 77 vol %, based on the total volume of the nickel-titanium composition.

The second phase comprises nickel and titanium in an atomic ratio of about 0.70:0.30 to about 0.80:0.20, specifically about 0.72:0.28 to about 0.78:0.22. In an exemplary embodiment, the atomic ratio of nickel to titanium is about 0.75:0.25 and the composition of the phase can be designated as Ni$_3$Ti.

The nickel-titanium composition comprises the second phase (Ni$_3$Ti) in an amount of about 7 to about 20 vol %, specifically about 8 to about 17 vol %, and more specifically about 9 to about 15 vol %, based on the total volume of the nickel-titanium composition. In an exemplary embodiment, the nickel-titanium composition comprises the first phase ($Ni_3Ti$) in an amount of about 9.8 vol %, based on the total volume of the nickel-titanium composition.

The third phase comprises nickel and titanium in an atomic ratio of about 0.52:0.48 to about 0.62:0.38, specifically about 0.54:0.46 to about 0.60:0.0.40. In an exemplary embodiment, the atomic ratio of nickel to titanium is about 0.57:0.43 and the composition of the phase can be designated as $Ni_4Ti_3$.

The nickel-titanium composition comprises the third phase ($Ni_4Ti_3$) in an amount of about 8 to about 15 vol %, specifically about 9 to about 14 vol %, and more specifically about 10 to about 13 vol %, based on the total volume of the nickel-titanium composition. In an exemplary embodiment, the nickel-titanium composition comprises the third phase ($Ni_4Ti_3$) in an amount of about 11 vol %, based on the total volume of the nickel-titanium composition.

The fourth phase comprises nickel and titanium in an atomic ratio of about 0.60:0.40 to about 0.67:0.33, specifically about 0.60:0.40 to about 0.75:0.25. In an exemplary embodiment, the atomic ratio of nickel to titanium is about 0.67:0.33 and the composition of the phase can be designated as $NiTi_2$.

The nickel-titanium composition comprises the fourth phase ($NiTi_2$) in an amount of up to about 5 vol %, specifically about 1 to about 4 vol %, and more specifically about 1.5 to about 3 vol %, based on the total volume of the nickel-titanium composition. In an exemplary embodiment, the nickel-titanium composition comprises the third phase ($NiTi_2$) in an amount of about 2.2 vol %, based on the total volume of the nickel-titanium composition.

The nickel-titanium composition comprises grains having an average grain size of about 20 to 80 micrometers, specifically about 30 to about 70 micrometers, and more specifically about 35 to about 60 micrometers. In an exemplary embodiment, the nickel-titanium composition comprises grains having an average size of about 40 micrometers.

The nickel-titanium composition thus manufactured has superior properties over other commercially available nickel-titanium compositions that are manufactured using other methods. The nickel-titanium composition is non-magnetic having a magnetic permeability of less than or equal to about 1.002. The nickel-titanium composition has a melting point of about 1,125° C. The nickel-titanium composition has an impact strength of up to about 56 foot-pound (ft-lb), and a surface hardness of about 40 to about 62 Rockwell (RC). In an exemplary embodiment, the nickel-titanium composition has a surface hardness of up to about 60HRC. The nickel-titanium composition has a density of about 0.242 to about 0.246 pounds per (cubic) inch. In an exemplary embodiment, the nickel-titanium composition has a density of about 0.244 pounds per inch (6.71 grams per cubic centimeter).

The nickel-titanium composition has Young's modulus of up to about 114 gigapascals (GPa). The elongation at break for the nickel-titanium composition is up to about 7% and the Young's Modulus can be up to about $16.5 \times 10^6$ psi. The nickel-titanium composition is electrically conductive has an electrical resistivity of up to about $80 \times 10^{-6}$ ohm-centimeter.

The nickel-titanium composition has a thermal conductivity of about 9 to about 11 joules per Kelvin-meter-second. In an exemplary embodiment, the nickel-titanium composition has a thermal conductivity of up to about 10 joules per Kelvin-meter-second (J/K-meter-seconds) and a mean coefficient of thermal expansion of about $10.4 \times 10^{-6}$ per ° C.

Articles manufactured from the powdered composition can be used as medical devices the bodies of living beings. Examples of medical devices include orthopedic prostheses, implants, spinal correction devices, fixation devices for fracture management, vascular and non-vascular stents, minimally invasive surgical instruments, filters, baskets, forceps, graspers, orthodontic appliances such as dental implants, arch wires, drills and files. The nickel-titanium composition can be used to produce articles for used in fluid control devices. Examples of fluid control devices are valves and valve seats, rotors, shafts and vanes. The nickel-titanium composition can also be used in machine tools such as for example tool bits, cams and gears. A variety of different gears can be manufactured from the nickel-titanium composition. Examples of suitable gears are sprockets, spur gears, crown gears, bevel gears, helical gears, hypoid gears, sun and planet gear, rack and pinion, and the like. It can also be used in aerospace and space applications.

Articles (e.g., bearings, bushings, gears, and the like) manufactured from the nickel-titanium powdered compositions in the manner described above are devoid of voids and pinholes. In contrast, articles manufactured from the melt have voids and pinholes. The presence of voids and pinholes results in defective bearings, which have non-uniform properties and which can damage other parts of the equipment in which they are utilized upon undergoing failure.

In one embodiment, articles manufactured from the nickel-titanium composition are free from pinholes and voids. In another embodiment, the articles have less than or equal to about 20 volume percent of pinholes and voids, specifically less than or equal to about 10 volume percent of pinholes and voids, specifically less than or equal to about 8 volume percent of pinholes and voids, specifically less than or equal to about 7 volume percent of pinholes and voids, specifically less than or equal to about 5 volume percent of pinholes and voids, specifically less than or equal to about 3 volume percent of pinholes and voids, specifically less than or equal to about 2 volume percent of pinholes and voids, and more specifically less than or equal to about 1 volume percent of pinholes and voids.

In addition, the articles manufactured by the aforementioned methods have a uniform hardness across their surfaces prior to machining This permits machining of articles to fine tolerances. It also permits the articles to be easily machined. In contrast, articles manufactured from a nickel-titanium melt have a non-uniform hardness across their surfaces prior to machining In one embodiment, the articles have a uniform surface hardness of about 58 to about 62 HRC, specifically 59 to 61 HRC over a surface area of up to 5 square inches. In one embodiment, the articles have a uniform surface hardness of about 58 to about 62 HRC, specifically 59 to 61 HRC over a surface area of up to 4 square inches. In one embodiment, the articles have a uniform surface hardness of about 58 to about 62 HRC, specifically 59 to 61 HRC over a surface area of up to 2 square inches.

In one embodiment, a friction reducing composition comprises the nickel-titanium composition and a lubricant. The nickel-titanium composition is generally in the form of a ball bearing or a roller bearing. Lubricants generally comprise a base oil (most often petroleum fractions, called mineral oils) in an amount of up to about 90 weight percent and up to about 10 weight percent additives. Vegetable oils or synthetic liquids such as hydrogenated polyolefins, esters, silicone, fluorocarbons are used as base oils. Additives deliver reduced friction and wear, increased viscosity, improved viscosity index, resistance to corrosion and oxidation, aging or contamination, or the like.

Non-liquid lubricants may also be used in the friction reducing composition. Non-liquid lubricants include grease, powders such as, for example dry graphite, polytetrafluoroethylene, molybdenum disulfide, tungsten disulfide, or the like may be used in the friction reducing composition.

The lubricant may be used in amounts of about 1 to about 10 wt %, based upon the total weight of the friction reducing composition. In one embodiment, the lubricant can be used in amounts of about 2 to about 8 wt %, specifically about 3 to about 7 wt %, based upon the total weight of the friction reducing composition. The nickel-titanium composition may be used in amounts of about 90 to about 99 wt %, based upon the total weight of the friction reducing composition.

The friction reducing composition can be used in machines where rolling or sliding friction occurs. Examples of such machines are turbines, motors, compressors, locomotives, airplanes, or the like.

The disclosure is further illustrated by the following non-limiting examples.

EXAMPLE

Example 1

Powdered nickel-titanium comprising 40 wt % titanium and 60 wt % nickel was poured into a mold. The average particle size for the powdered nickel-titanium was 90 micrometers.

Two mating mold halves were made with hemispherical cavities having a diameter of 0.560 inches and with runners and gates to the cavities. The assembled mold halves were purged with nitrogen, and the powdered nickel-titanium was injected into the mold cavities. The filled molds were placed in a sintering furnace in which they were sintered by holding them at 1850° F. for two hours. The spheroidal preforms were removed and were placed in a hipping furnace in which they were heated to 1650° F. for three hours and then cooled in the furnace for three hours. The annealed preforms had a hardness of 40 as measured on a Rockwell "C" scale.

The preforms were hand-ground to remove gates and mold parting lines to a diameter of 0.560 inches. The balls were machine ground to a diameter of 0.504 inch.

The balls were hardened by heating at 1790° F. in a nitrogen atmosphere for two hours and then quenching in oil. The balls were cleaned and the surface hardness was found to be 60 to 62 as measured on a Rockwell "C" scale. The balls were reground or lapped to remove any distortion.

The finished balls are found to have a diameter of about 0.500 (Grade 3) inch and to have a density of about 0.244 pounds per cubic inch.

Example 2

Figure 4:
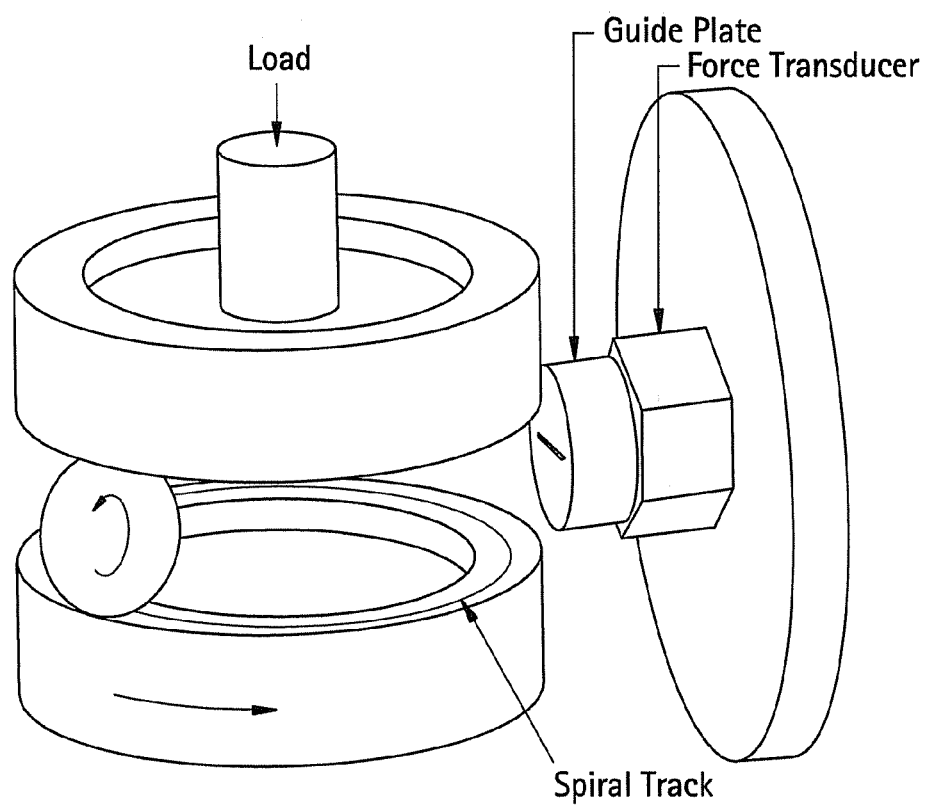
FIG. 4 is a schematic depiction of the Spiral-Orbit-Tribometer testing apparatus for performing the frictional testing.

Tests were conducted by NASA, which established a coefficient of friction of 0.3 or less. For the tribological testing, 0.5 inch diameter balls were sandwiched between two 50.8 mm diameter, 6 mm thick 440 C stainless steel disks in a Spiral-Orbit-Tribometer (SOT). The SOT is a device designed to simulate the rolling-sliding conditions that occur in an angular contact ball bearing. In the SOT, a single ball specimen is loaded between the faces of two disks, one stationary and one that rotates. The SOT testing machine along with the specimen configuration is detailed in FIG. 4.

One of the plates is stationary and the other rotates to drive the ball into an orbit that is an opening spiral. The ball contacts a "guide plate" at the end of each orbit, which forces the ball back into its initial orbital radius. The ball then exhibits, for a given coefficient of friction (CoF), a stable orbit, repeatedly over-rolling the track on both large plates and guide plate. The spiral's pitch and the length of the contact on the guide plate increases with the increase of the CoF. A piezoelectric force transducer supporting the guide plate senses the frictional force developed on the ball as it slides on the rotating plate during the contact of the ball with the guide plate. During this contact, the coefficient of friction is obtained from this force and the load imposed on the system. The tribometer is housed in a stainless steel chamber that can be evacuated by a turbomolecular pump to a vacuum of less than about $2 \times 10^{-8}$ Torr. It can be operated either in this vacuum environment or at atmospheric pressure.

The ball is under a compressive load and is driven through by the rotating upper disk. A SS 440C® guide plate, positioned tangentially to the rotating axis, prevents the ball from being ejected from between the disks. When the ball contacts the guide plate it undergoes a scrubbing action whereas at other times the ball is largely undergoing simple rolling contact with the plates. The force on the guide plate is measured and is used, along with the applied load, to calculate the coefficient of friction. Prior to being tested, the ball is dipped into a dilute solvent-oil solution, then withdrawn.

After the solvent evaporates, a micro-thin layer of oil remains as a film on the ball surface. The lubricant volume is estimated by weighing the ball before and after lubrication using the oil density to calculate the retained oil volume (generally in the range of 25 micrograms). The lubricated ball specimen is then loaded into the rig. The load on the ball is set at (13.6 kilograms (Kg)) to give a contact stress of 1.5 gigapascals (GPa). Prior to testing, the test chamber is evacuated to a pressure of $10 \times E^{-06}$ pascals (Pa). The lubricant selected for this test was PENNZANE 2001A®. 21 micrograms of PENNZANE 2001A® was used as the lubricant. PENNZANE 2001A® is a mixture of di- and tri-substituted (2-octyldodecyl) cyclopentane.

In this manner, the test better simulates operation of a bearing in a space environment. The standard test protocol places the ball under load and then the upper disk is rotated at 100 rpm. Each time the ball passes over the guide plate surface it imparts a scrubbing force that is measured with a load cell. This force is then used to calculate a coefficient of friction that correlates well with that measured in pure sliding conditions. Over time, the tribological boundary lubrication actions chemically deplete the thin oil film leading to a rise in observed friction. The rate at which the lubricant is depleted is a measure of the suitability of the material in a bearing application with respect to lubricant life. In general, well-lubricated contacts exhibit friction coefficients of about 0.1 to about 0.2. When friction exceeds 0.3 the lubricant life is considered depleted and the test is terminated. For reference, standard aerospace materials, like 440C, tested in this manner exhibit 30,000 to 50,000 disk revolutions before friction levels rise.

The ball tested in this example was a nickel-titanium bearing made in the manner described above from the nickel-titanium composition.

Figure 5:
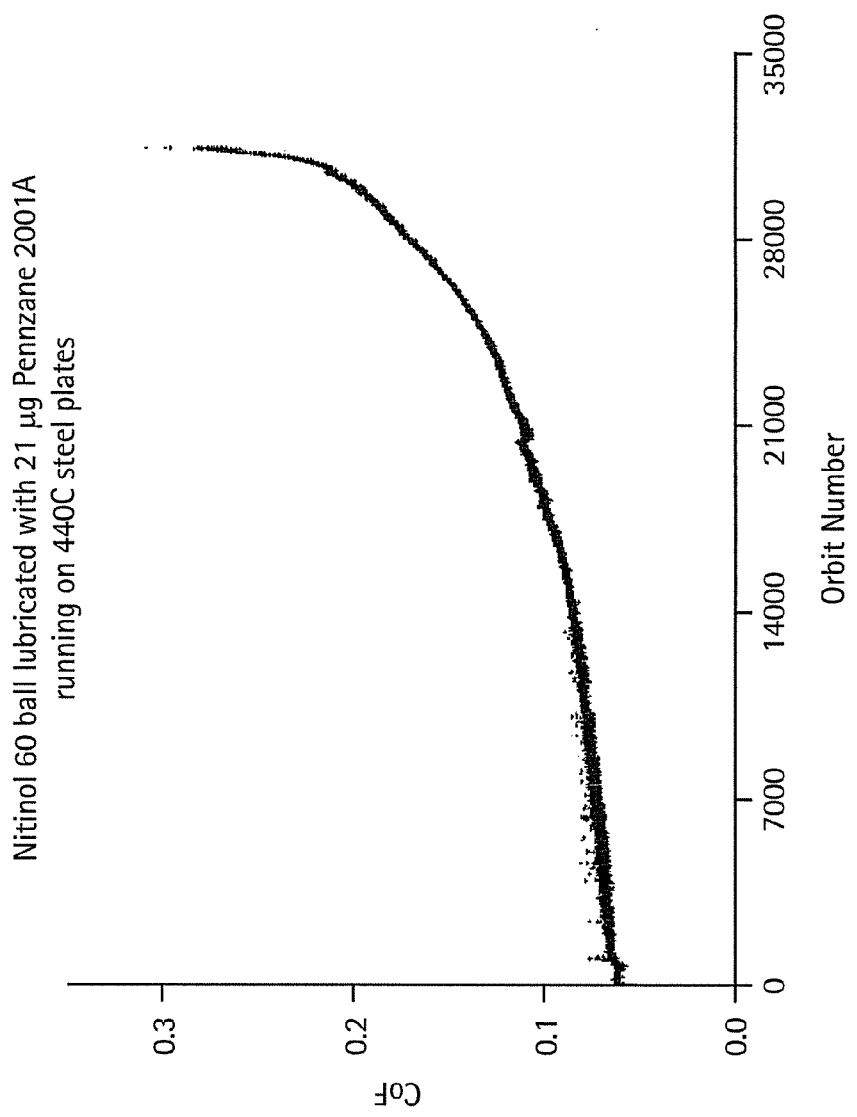
FIG. 5 is a graphical result showing the coefficient of friction (CoF) for a Nitinol 60 ball comprising the disclosed nickel-titanium composition. The nickel-titanium composition is manufactured by the process disclosed herein.

The results are depicted graphically in the FIG. 5 where the coefficient of friction is measured versus the orbit number (also known as the number of cycles). As can be seen from the FIG. 5, the coefficient of friction for the nickel-titanium bearing shows a gradual increase in the coefficient of friction up to about 30,000 orbits. At about 30,000 orbits, the coefficient of friction increases rapidly and reaches about 0.3.

Thus a bearing manufactured from the nickel-titanium compositions disclosed herein displays a coefficient of friction of about 0.05 to about 0.1 when subjected to an amount of greater than or equal to about 15,000 orbits (cycles), specifically greater than or equal to about 17,000 orbits and more specifically an amount of greater than or equal to about 20,000 orbits. In another embodiment, bearings manufactured from the disclosed composition show a coefficient of friction of about 0.1 to about 0.2 when subjected to greater than or equal to about 22,000 orbits, specifically greater than or equal to about 25,000 orbits.

Example 3

This example was conducted to compare the tribological properties of the nickel-titanium compositions disclosed herein with that of SS 440C, when both materials are lubricated. The lubricant selected for this test was PENNZANE 2001A®. PENNZANE 2001A® is a mixture of di- and tri-substituted (2-octyldodecyl) cyclopentane. The chemical structures for PENNZANE 2001A® are depicted in the FIG. 6. Balls manufactured from the nickel-titanium compositions disclosed herein, from SS 440C® or from SS 440C® coated with a layer of titanium were subjected to a wear life test in a Spirol-Orbit-Tribometer (SOT). The test was conducted in a manner similar to that in the Example 2. The plates upon which the balls were tested were manufactured from SS 440C® and the tests were conducted in a vacuum.

Figure 7:
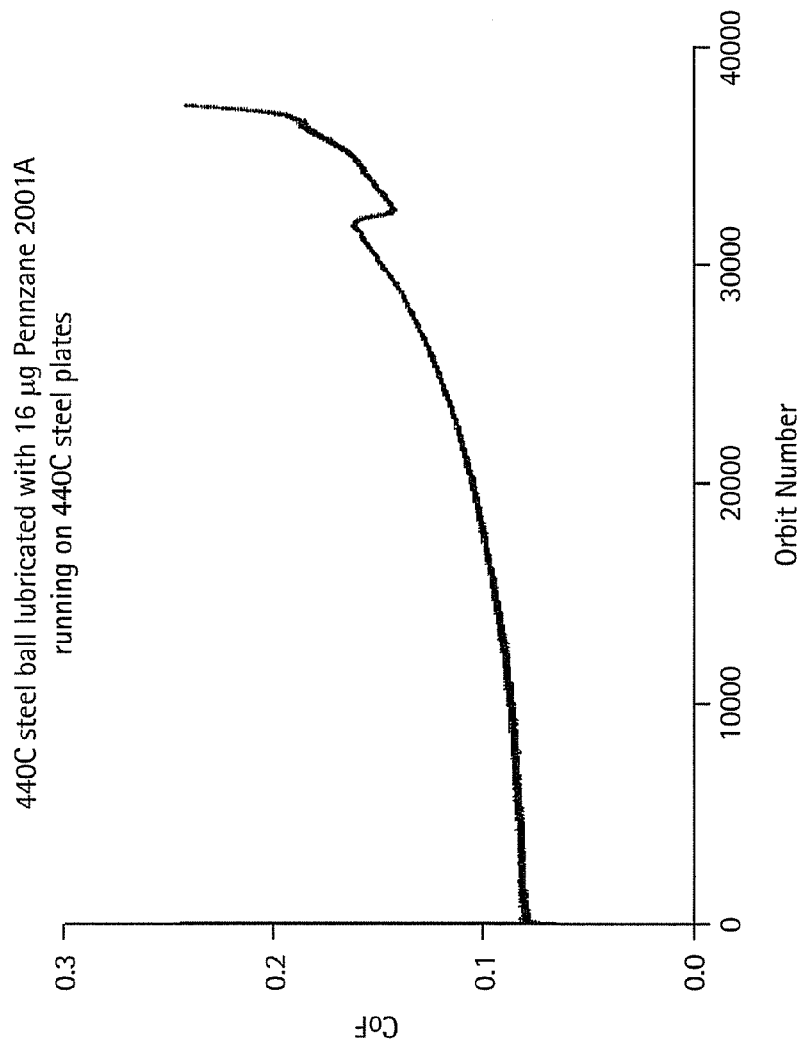
FIG. 7 is a graph showing the results for the initial stage of the frictional test with a SS 440C® ball.

The sensitivity of the SOT test to the surface chemical constitution of the respective balls is illustrated in FIGS. 7, 8, 9 and 10. FIG. 7 reflects the results for the initial stage of the test with a SS 440C® ball, while FIG. 8 reflects the results for the initial stage of the test with a SS 440C® ball coated with a thin film of titanium.

Figure 8:
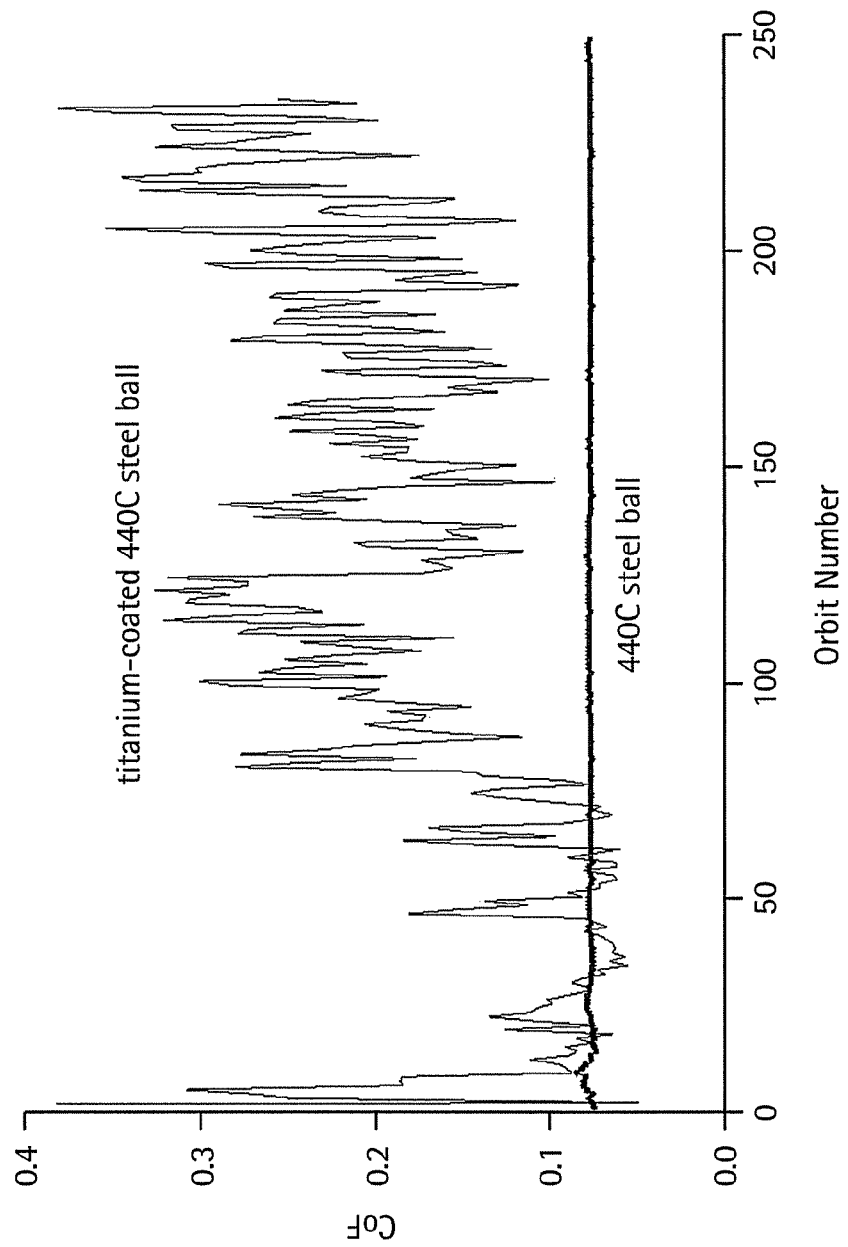
FIG. 8 is a graph showing the results for the initial stage of the frictional test with a SS 440C® ball coated with a thin film of titanium.

It is evident from the high erratic coefficient of friction (CoF) of the test with the titanium-coated ball that the system is not operating in a lubricated manner. This is ascribed to the destruction of the Pennzane's molecular structure, and attendant loss of lubrication capability, by the tribochemically aggressive titanium film with which it is in contact. This test demonstrates that only one partner of a tribological pair needs to be tribochemically aggressive to prevent effective lubrication. Such highly aggressive tribochemical behavior was also observed with a nickel-titanium ball coated with titanium (results not shown). These observations demonstrate that the degradation of the lubricant is not dependent on the particular mechanical properties of the ball, but is really of chemical origin i.e., it is the uninhibited titanium coating disposed upon the respective balls that destroys and degrades the lubricant. FIG. 8 therefore illustrates the extreme cases within which a test of the capability of lubricating a particular material falls—lubrication, indicated by low and constant coefficient of friction and lack of lubrication, indicated by high and erratic coefficient of friction.

The balls made from the nickel-titanium composition (manufactured in the manner disclosed herein) and not coated with any additional titanium was also subjected to the friction test after being lubricated with PENNZANE 2001A®.

Figure 9:
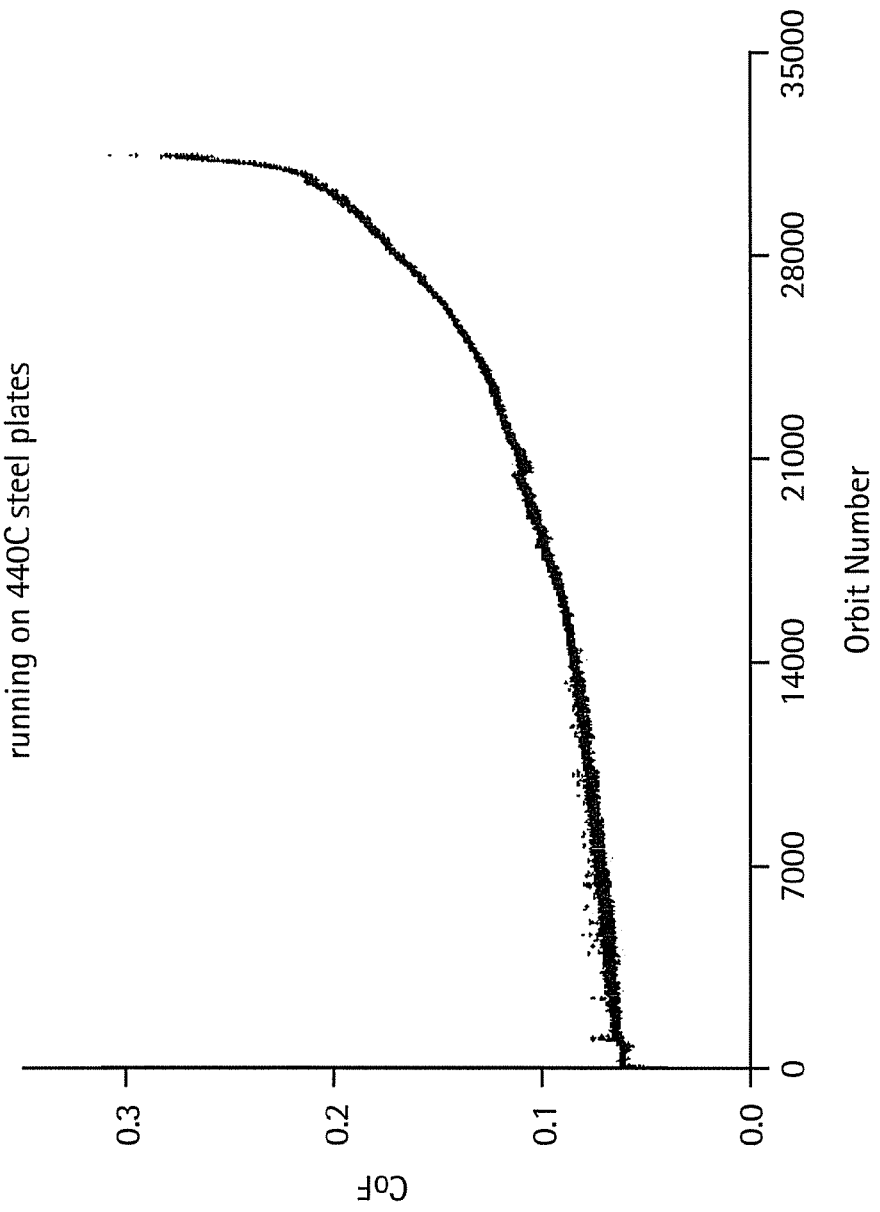
FIG. 9 is a graph showing the frictional trace of balls made from the nickel-titanium composition disclosed herein and lubricated with PENNZANE 2001A® and running on SS 440C® plates.
Figure 10:
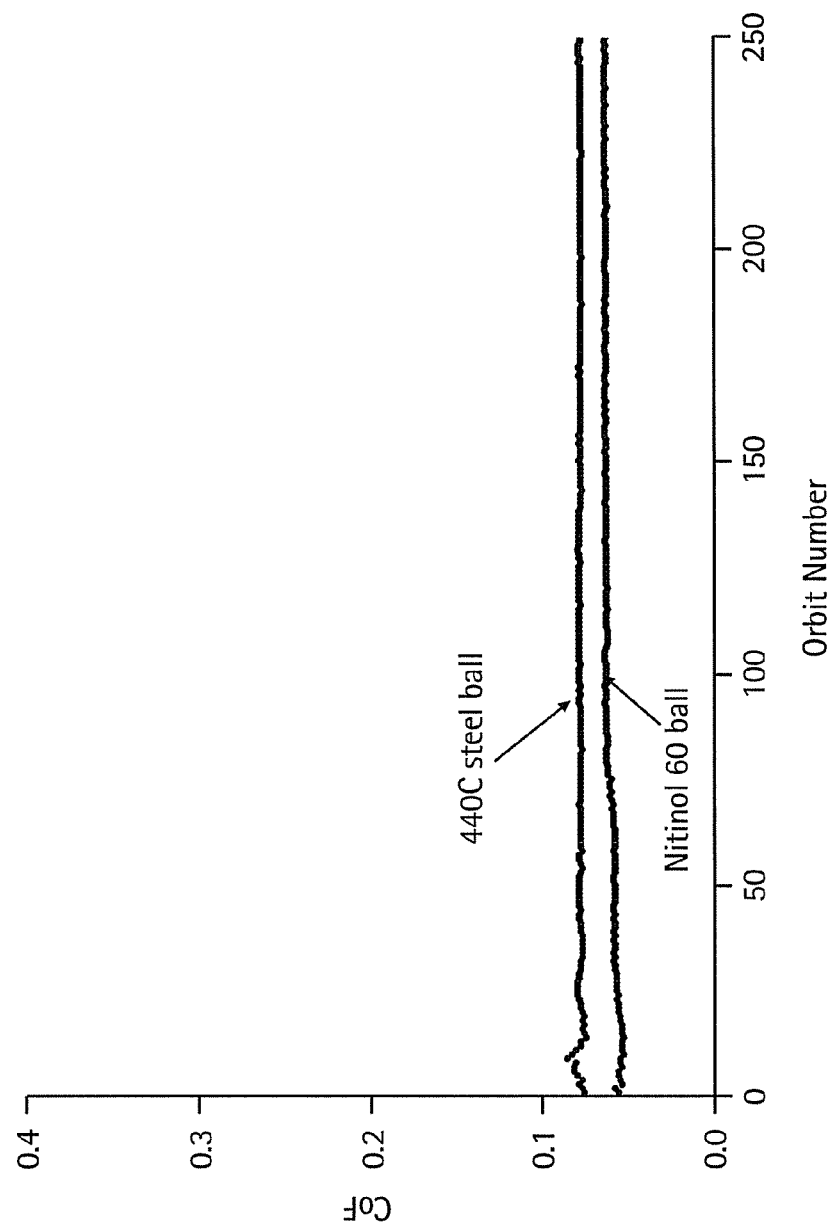
FIG. 10 is a graph comparing the initial stage of friction traces comparing the all-SS 440C® steel system to the system with the nickel-titanium composition ball running on SS 440C® steel plates.

The friction trace of balls made from the nickel-titanium composition lubricated with PENNZANE 2001A® and running on SS 440C® plates is shown in the FIG. 9. The trace exhibits the same characteristics as the trace for the PENNZANE 2001A®/all-SS 440C® steel system (SS 440C® balls measured on SS 440C® plates) shown in FIG. 7. From the FIG. 9, it can be seen that there is low constant initial coefficient of friction that gradually increases to the high values ascribed to consumption of the lubricant by tribochemical attack. The initial stage of friction traces comparing the all-SS 440C® steel system to the system with the nickel-titanium composition ball running on SS 440C® steel plates is shown in FIG. 10. This figure illustrates the similarity of the behavior of the coefficient of friction for the two systems, although the ball with the nickel-titanium composition ball exhibits somewhat lower initial values of the coefficient of friction. All tests with the nickel-titanium composition balls running on SS 440C® steel plates exhibited this behavior. It is thus concluded that the balls and other bearings comprising the nickel titanium composition manufactured in the method disclosed herein can be effectively lubricated by the popular lubricant PENNZANE 2001A®.

The friction traces of the asymmetric system (SS 440C® plates and balls manufactured from the nickel-titanium composition disclosed herein) generally exhibit failure at fewer orbits than does the symmetric system (SS 440C® plates and balls manufactured from the SS 440C®).

The normalized lifetime to characterize the system's tribochemical aggressiveness is the number of orbits to achieve a coefficient of friction of 0.2 divided by the lubricant charge in milligrams. A shorter normalized lifetime implies greater tribochemical aggressiveness. The normalized lifetime for any given system does exhibit variability. The Table 1 below presents normalized lifetimes and initial coefficients of friction obtained in the SOT for the symmetric and asymmetric systems under consideration here. The asymmetric system with the nickel-titanium composition balls exhibits somewhat shorter lifetimes than does the symmetric system with the SS 440C® steel ball, implying, in accord with the comments in the previous section, suggesting that nickel-titanium balls are somewhat more tribochemically aggressive than is SS 440C® balls.

However, it is to be noted that the tests with the nickel-titanium balls were performed at the lower Hertz pressure of 1.06 GPa compared to the higher Hertz pressure of 1.5 GPa at which the SS 440C® balls were run. This was determined by virtue of a test conducted at a system load of 30 pounds, which resulted in a track width of 0.4 mm. This is close to that of a test with a SS 440C® steel ball at a load of 43 pounds, which corresponds to a Hertz pressure of 1.5 GPa at the ball/plate contact. The 30 pound load in the nickel-titanium tests corresponds to a Hertz pressure of 1.06 GPa Such a Hertz pressure is obtained if the nickel-titanium composition material have an elastic modulus of 114 GPa, close to that of the Ti-6A1-4V alloy.

Thus, the comparison is not completely direct and the relative degree at which nickel-titanium composition attacks the PENNZANE 2001A® remains to be better determined. However, whatever its degree, it is clear that it does not preclude effective lubrication of balls that comprise nickel-titanium.

TABLE 1

|  | SS 440C ® ball | | | Nickel-titanium composition ball | | |
| --- | --- | --- | --- | --- | --- | --- |
| Normalized lifetime, orbits/µg | 1981 | 2302 | 1347 | 1429 | 1024 | 836 |
| Initial CoF | 0.079 | 0.079 | 0.081 | 0.061 | 0.062 | 0.059 |

Figure 11:
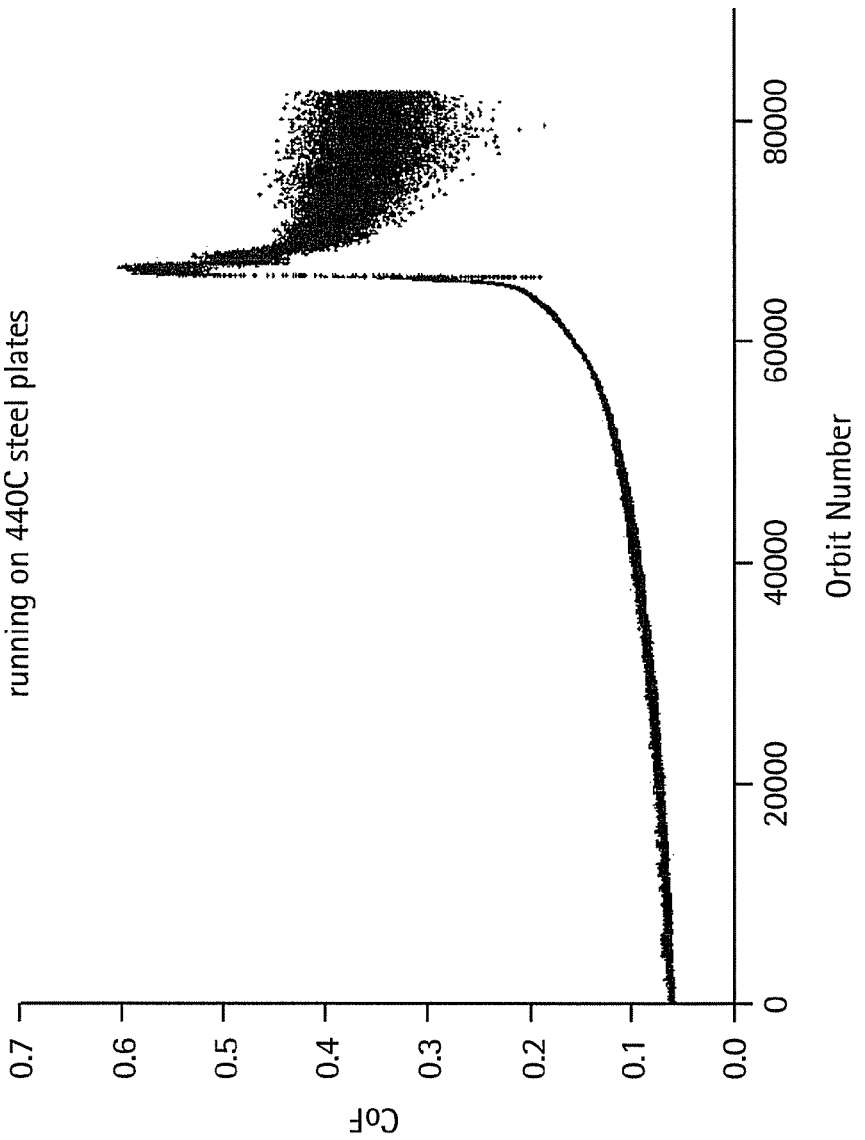
FIG. 11 shows a friction trace of a test where the test was continued to exceed the nominal cutoff value of the coefficient of friction of 0.3 and kept running into the failure region.
Figure 12:
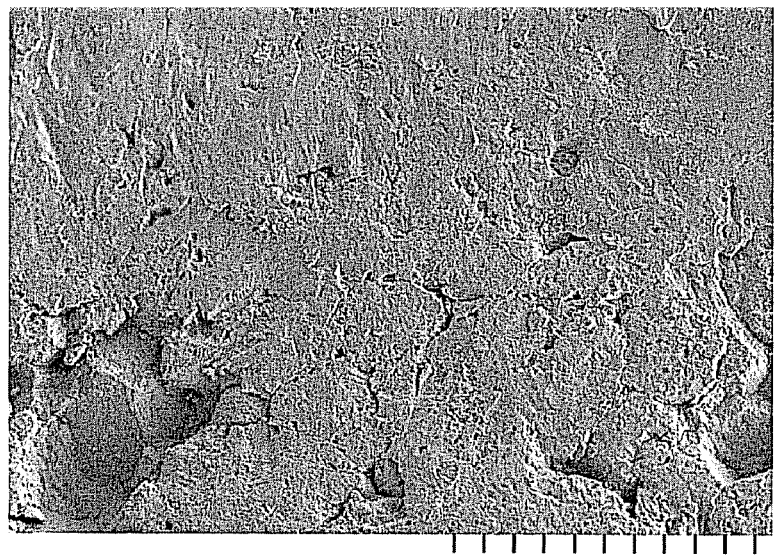
FIG. 12 shows a micrograph of the nickel-titanium ball surface after the test in the Example 3.

The FIG. 11 shows a friction trace of a test where the test was continued to exceed the nominal cutoff value of the coefficient of friction of 0.3 and kept running into the failure region. The system is observed not to gall and seize up, but instead to continue to run, albeit with a high coefficient of friction of 0.3 to 0.4. FIG. 12 shows a micrograph of the nickel-titanium ball surface after this test. It is worn but does not show signs of galling or material buildup and transfer. It thus appears that the asymmetric system comprising nickel-titanium balls on SS 440C® steel plate system fails "gracefully" without the self-destructive seizure characteristic of many all-steel tribo systems.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A nickel-titanium composition comprising:
    a first phase that comprises nickel and titanium in an atomic ratio of about 0.45:0.55 to about 0.55:0.45;
    a second phase that comprises nickel and titanium in an atomic ratio of about 0.70:0.30 to about 0.80:0.20; and
    a third phase that comprises nickel and titanium in an atomic ratio of about 0.52:0.48 to about 0.62:0.38.

2. The nickel-titanium composition of claim 1, further comprising a fourth phase that comprises nickel and titanium in an atomic ratio of about 0.60:0.40 to about 0.67:0.33.

3. The nickel-titanium composition of claim 2, comprising the fourth phase in an amount of up to about 5 volume percent, based on the total volume of the nickel-titanium composition.

4. The nickel-titanium composition of claim 1, further comprising a lubricant.

5. The nickel-titanium composition of claim 1, comprising the first phase in an amount of about 65 volume percent to about 85 volume percent, based on the total volume of the nickel-titanium composition.

6. The nickel-titanium composition of claim 1, comprising the second phase in an amount of about 7 volume percent to about 20 volume percent, based on the total volume of the nickel-titanium composition.

7. The nickel-titanium composition of claim 1, comprising the third phase in an amount of about 8 volume percent to about 15 volume percent, based on the total volume of the nickel-titanium composition.

8. The nickel-titanium composition of claim 1, further comprising a lubricant.

9. The nickel-titanium composition of claim 1, wherein the first phase is a matrix phase.

10. The nickel-titanium composition of claim 1, wherein the second phase and the third phases are dispersed phases.

11. The nickel-titanium composition of claim 1, wherein the nickel-titanium composition comprises grains having an average grain size of about 20 to 80 micrometers.

12. The nickel-titanium composition of claim 1, where the first phase has an atomic ratio of nickel to titanium of 1:1.

13. The nickel-titanium composition of claim 1, where the second phase has an atomic ratio of nickel to titanium of 3:1.

14. The nickel-titanium composition of claim 1, where the third phase has an atomic ratio of nickel to titanium of 4:3.

15. An article comprising the composition of claim 1.

16. The article of claim 15, where the article is a gear, a bearing or a cam.

17. A bearing for reducing friction comprising:
    a nickel-titanium composition comprising:
        a first phase that comprises nickel and titanium in an atomic ratio of about 0.45:0.55 to about 0.55:0.45;
        a second phase that comprises nickel and titanium in an atomic ratio of about 0.70:0.30 to about 0.80:0.20; and
        a third phase that comprises nickel and titanium in an atomic ratio of about 0.52:0.48 to about 0.62:0.38;
        where the bearing is free from voids and pinholes.

18. The bearing of claim 17, comprising the first phase in an amount of about 65 volume percent to about 85 volume percent, based on the total volume of the nickel-titanium composition.

19. The bearing of claim 17, comprising the second phase in an amount of about 7 volume percent to about 20 volume percent, based on the total volume of the nickel-titanium composition.

20. The bearing of claim 17, comprising the third phase in an amount of about 8 volume percent to about 15 volume percent, based on the total volume of the nickel-titanium composition.

21. The bearing of claim 17, comprising a fourth phase in an amount of up to about 5 volume percent, based on the total volume of the nickel-titanium composition, where the fourth phase comprises nickel and titanium in an atomic ratio of about 0.60:0.40 to about 0.67:0.33.

* * * * *